United States Patent [19]

Kawachi

[11] 4,126,283
[45] Nov. 21, 1978

[54] MAGNETIC TAPE CASSETTE

[76] Inventor: Kazuo Kawachi, No. 8-1-1020, Funabashi 7-chome, Setagaya-ku, Tokyo, Japan

[21] Appl. No.: 769,267

[22] Filed: Feb. 16, 1977

[30] Foreign Application Priority Data

Feb. 23, 1976 [JP] Japan .............................. 51-20314[U]

[51] Int. Cl.² .......................... G03B 1/04; G11B 15/32
[52] U.S. Cl. ...................................... 242/199; 242/210
[58] Field of Search ........................... 242/76, 197–200, 242/210; 360/132

[56] References Cited

U.S. PATENT DOCUMENTS 3,495,787  2/1970  Wallace ................................. 242/199
3,934,842  1/1976  Posso .................................... 242/199

Primary Examiner—Leonard D. Christian
Attorney, Agent, or Firm—Blanchard, Flynn, Thiel, Boutell & Tanis

[57] ABSTRACT

A magnetic tape cassette comprises molded upper and lower cassette halves which are identical to each other in shape and structure and are symmetrical. The cassette halves are affixed to each other in opposed symmetric relation to define a hollow cassette body. A separately molded tape guide assembly is fixedly sandwiched between the cassette halves within the body and itself incorporates the forward facing tape guides and flanking tape rollers for face engaging and guiding the tape between a pair of rotatable tape hubs also carried by and between the cassette halves.

7 Claims, 9 Drawing Figures

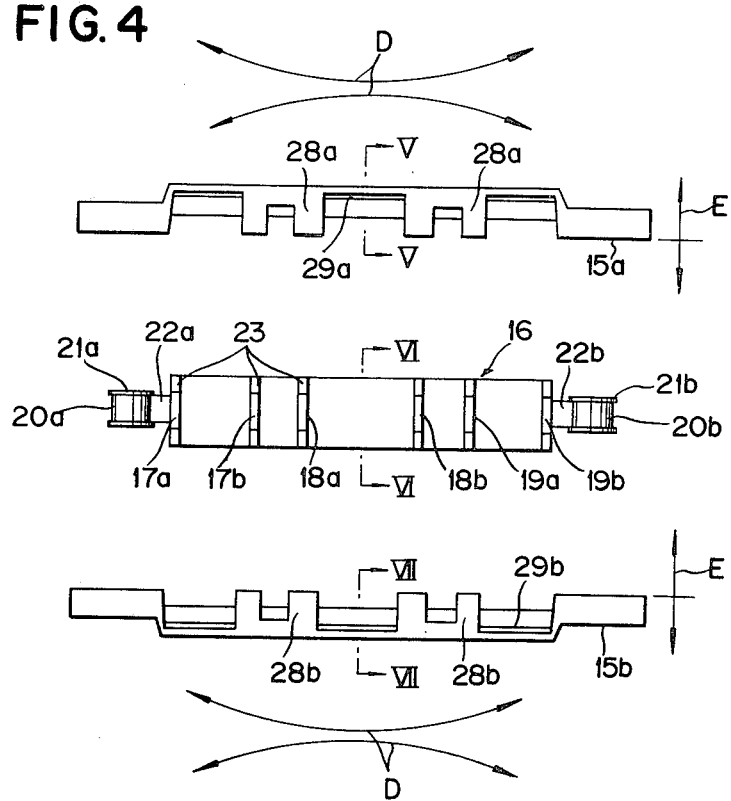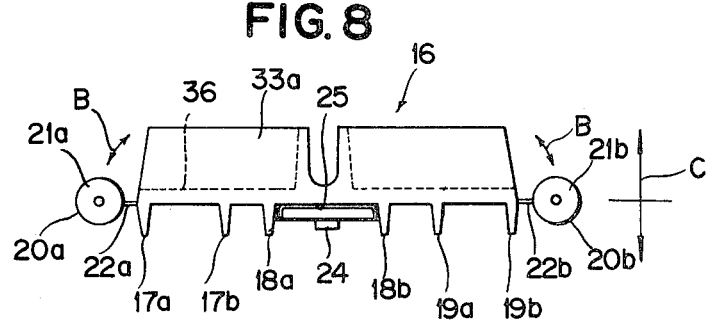

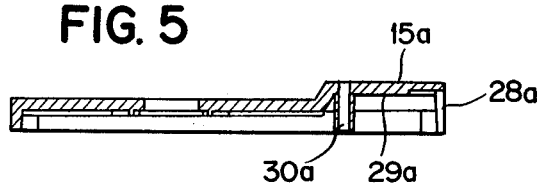
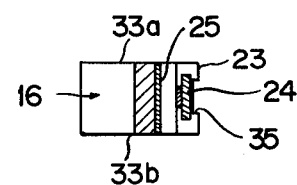
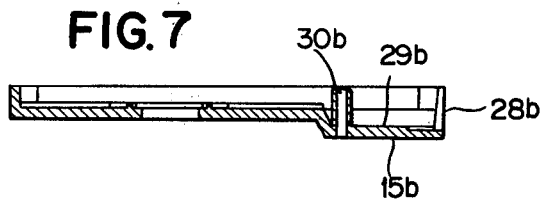
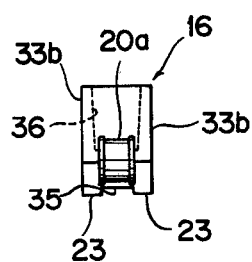

MAGNETIC TAPE CASSETTE

The present invention relates to improvements in and relating to magnetic tape cassettes (hereinafter simply referred to as cassettes), and more particularly the invention relates to such cassette incorporating an improved tape guide structure.

At first, for the better understanding of the invention, the prior art will be described only briefly with reference to FIGS. 1 and 2.

FIGS. 1 and 2 show the construction of a typical cassette known in the art. More specifically, tape guides 3a, 3b, 4a, 4b, 5a, 5b and 6 are made integral with either one of cassette halves 1 and 2, and tape guide rollers 7a and 7b are rotatably mounted on the shaft pins which are molded integral with either the cassette half 1 or 2 or the metallic shaft pins are fixedly fitted in the cassette half 1 or 2. Numeral 8 designates a pressure pad for pressing the magnetic tape against the heads of a record-playback machine, and numeral 9 is a shielding plate. Window frames 10a and 10b are molded integral with the cassette halves 1 and 2, and a magnetic tape 12 would on rotatably mounted hubs 11a and 11b is taken up on the hub 11b from the hub 11a and vice versa as the tape is fed between the tape guides 3a, 3b, 4a, 4b, 5a and 5b and the window frames 10a and 10a through the tape guides 6 and the tape guide rollers 7a and 7b. The magnetic tape 12 is so designed that audio signals can be recorded on and played back from the magnetic tape 12 stereophonically or monophonically in opposite directions, and its one direction is conventionally called as a side A and the other direction as a side B.

As it is often described figuratively as compact, micro or the like, such conventional cassette is very small and compact, and particularly its tape guide assembly is very complicated in construction requiring a very high degree of dimensional accuracy. Thus, the manufacture of the molds for injection molding the cassette halves 1 and 2 is extremely costly, and it is even believed that the use of numerically controlled machine tools is essential for the manufacture of such molds of excellent workmanship. In the mass production of cassettes, however, even the use of such molds would be able to ensure the production of only a very limited number of cassettes that could meet the various required characteristics, and particularly in the case of cassette halves for test tapes, due to the fact that a higher degree of dimensional accuracy than the ordinary cassettes is required, the production yield would further drop to several percents thus making it still harder to overcome the problem. The most serious defect with regard to the various characteristics is the fact that particularly it is impossible to ensure the same azimuth characteristic for each of the sides A and B of the magnetic tape 12 in the cassette halves in relation to the magnetic heads of a record-playback machine, and it is thus impossible to obtain the desired frequency characteristic. This is due to an inevitable consequence of the fact that the component parts of cassette halves have heretofore been manufactured, for the most part, by injection molding plastic material. Namely, the conventional cassette halves incorporate a complicated tape guide structure formed integral therewith, and moreover its construction must satisfy a high degree of dimensional accuracy in view of the above-mentioned requirements. In fact, however, in view of the need due to a tape mounting operation and the fact that there must be no joint in the faces constituting tape guides, the pair of upper and lower cassette halves 1 and 2 can never be identical in shape, and in most cases the tape guides 3a, 3b, 4a, 4b, 5a, 5b and 6 as well as the guide rollers 7a and 7b are provided on one cassette half 1 which in turn serves as a cassette body and the other cassette half 2 is designed to serve as a cover for the cassette body. Although there is another known cassette in which a part of the tape guides is disposed on the cassette half 2, the cassette halves 1 and 2 of these known cassettes are not symmetrical and identical in shape with each other. As a result, even if cassette halves 1 and 2 were injection molded by the same mold under the same injection molding conditions, there would inevitably result such injection molding strains or distortions as molding shrinkage, local shrinkage, sink mark, warpage, etc., and these distortions take the different forms of defects in the cassette halves 1 and 2. Namely, the resulting tape guide group cannot present the same condition for the side A which is related to the cassette half 1 and for the side B which is related to the cassette half 2, and consequently it is extremely difficult to ensure the same azimuth for each of the tape sides. In addition, to reduce such molding distortions as far as possible, it is necessary to sacrifice the productivity to a great extent, and this is extremely disadvantageous from the mass production point of view and tends to increase the manufacturing cost. It may safely be said that according to the prevailing practice, cassette halves have been molded so as to rather intentionally deform the entire cassette halves to tend to warp and thereby ensure a close contact between the mating surfaces of cassette halves 1 and 2. Moreover, in order to facilitate the release of injection molded products from the mold and ensure an improved productivity, it has been the practice to provide the tape guides with an angle 13, a so-called draft, in a release direction A, and particularly where the construction of tape guides is elaborate and complex, the injection molding of cassettes has been considered impossible without the provision of such drafts. Even if the amount of such drafts could be reduced to a great extent, the provision of drafts would still be a great disadvantage from the standpoint of mass production. When coupled with the previously mentioned distortions due to injection molding, the presence of such drafts tends to cause improper azimuth of the tape. Also the fact that the tape guides 3a, 3b, 4a, 4b, 5a, 5b and 6 are molded integral with either the cassette half 1 or 2, gives rise to a number of disadvantages from the standpoint of performance and function of cassettes depending on the kind of material used therefor. In other words, while, to date the prior art cassette halves have been injection molded by using polystyrol as a material, this material is not an excellent material as an engineering plastic, though it is an inexpensive material. Particularly, polystyrol is not suitable to function as tape guides in consideration of its friction properties, wear properties, rigidity, elasticity, antistatic properties, etc., and moreover the use of any other material having superior properties is also disadvantageous, since such tape guides will be integrally molded thus involving the use of the material in the unnecessary portions and thereby increasing the manufacturing cost considerably. The same also applies to shaft pins 14a and 14b on which are fitted the tape guide rollers, if they were molded integral with the cassette half, and it will be necessary to apply a lubricating agent such as silicone oil on the shaft pins so as to prevent wear of the shaft pins and ensure a reduced friction, thus requiring additional labor and thereby causing disadvantages from both the production and cost points of view. Another disadvantage of the conventional cassettes is that since the tape guides 6 and the tape guide roller pins will be molded integrally with either the cassette half 1 or 2 and thus fixedly held in place, the tape transport system includes in no part thereof the necessary function for absorbing and controlling fluctuations in the tape movement and variations in the tape tension, with the result that the tape movement is made unstable and there is the great danger of the tape being damaged during the fast forward or rewinding operation of the tape. The tape movement is particularly unstable in the case of thin-gage tapes such as the C-120.

With a view to overcoming the foregoing deficiencies of the prior art, it is an object of the invention to provide a magnetic tape cassette wherein a tape guide assembly is not integrally molded with either of two cassette halves, i.e., the tape guide assembly is molded as a separate unit, and it is sandwiched and fixedly held in place between the two cassette halves. In this way, the two cassette halves can be designed to serve as a mere case for containing therein the separately molded tape guide assembly and other inner component parts and for operatively associating or aligning the cassette reference surfaces and openings on the cassette half outer surfaces with the inner component parts, namely, the cassette can be divided into the tape guide portion requiring a high degree of dimensional accuracy and the cassette half portions requiring a relatively low degree of dimensional accuracy, and this is a rational way of production. Particularly, this has the effect of making the manufacture of cassette halves much easier from the dimensional accuracy point of view, considerably reducing the manufacturing cost of molds and offering great advantages from the production and cost points of view. Moreover, although the tape guide assembly requires a high degree of dimensional accuracy, the tape guide assembly is a component part of the cassette halves and thus it is dimensionally as small as less than one fourth of the cassette half, permitting the use of a multiple cavity mold and proving rational.

It is a second object of the invention to provide a magnetic tape cassette wherein two cassette halves are symmetrical and identical in shape with respect to the portions operatively associated with a tape guide assembly, the reference surfaces, etc., that is, to provide a magnetic tape cassette wherein two cassette halves are of the identical shape. This arrangement is extremely rational and advantageous over the prior art cassettes from the production, handling and operation points of view, since the cassette halves have the injection molding strains and distortions of the similar nature and degree thus greatly reducing variations in distortion among the cassette halves, since the cassette halves are symmetrical in shape with respect to the tape guide assembly thus producing the same effects, and since the cassette halves and the tape guide assembly are symmetrical or identical with one another, thereby eliminating the need to distinguish the cassette halves one from the other as the upper and lower cassette halves as in the case of the prior art cassettes.

It is a third object of the invention to provide a magnetic tape cassette wherein compensation is provided between cassette halves and between the cassette halves and a tape guide assembly for strains and distortions. More specifically, the cassette halves and the tape guide assembly are so designed that when the cassette halves and the tape guide assembly are assembled in a sandwich construction, their mold opening and releasing directions during the injection molding operation cross one another at right angles and consequently their faces and portions tending to distort are compensated and reinforced by their practically undistorted faces and portions. This is a great advantage from the standpoints of dimensional accuracy and strength, and moreover by virtue of the construction of the tape guide assembly, their tape guide faces, i.e., those faces which contact with the magnetic tape surface need not be provided with any drafting taper for injection molding purposes and the remaining portions other than the tape guide faces can be sufficiently tapered for drafting purposes, thus proving advantageous in production and rational in performance. It will thus be seen that a cassette provided in accordance with this invention ensures an improved azimuth characteristic for each of the sides A and B of a magnetic tape which is of the prime importance for the cassette, ensures improved mass productiveness, yield rate and moldability and is inexpensive and highly efficient.

The above and other objects and features of the invention will appear more fully hereinafter from a consideration of the following description taken in connection with the accompanying drawings, FIGS. 3 to 9, wherein one example is illustrated by way of example.

FIGS. 3 to 9 show an embodiment of a magnetic tape cassette according to the invention, in which FIG. 3 is an exploded perspective view of the magnetic tape cassette;

FIG. 4 is an exploded front view of the magnetic tape cassette of FIG. 3 as viewed from the front;

FIGS. 5 to 7 are sectional views respectively taken along the lines V—V, VI—VI and VII—VII of FIG. 4;

FIG. 8 is a plan view of the tape guide assembly shown in FIG. 3; and

FIG. 9 is a side view of the tape guide assembly shown in FIG. 8.

Figure 1:
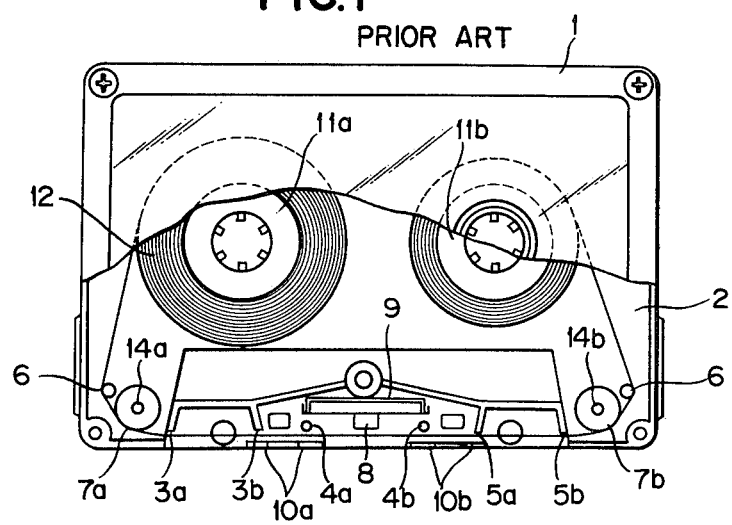
FIG. 1 is a plan view of a prior art magnetic tape cassette, with part thereof broken away.
Figure 2:
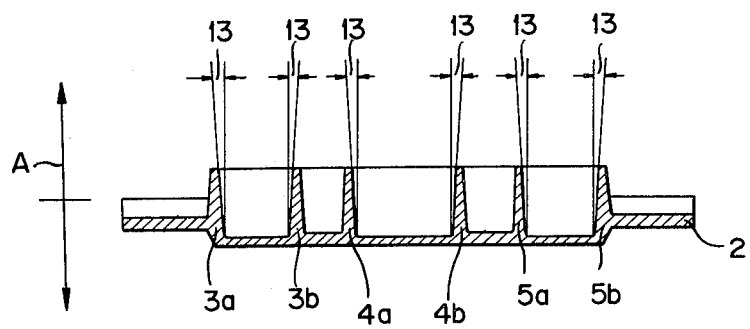
FIG. 2 is a sectional view of the front part of the tape guide assembly provided on the lower cassette half of the prior art magnetic tape cassette shown in FIG. 1.
Figure 3:
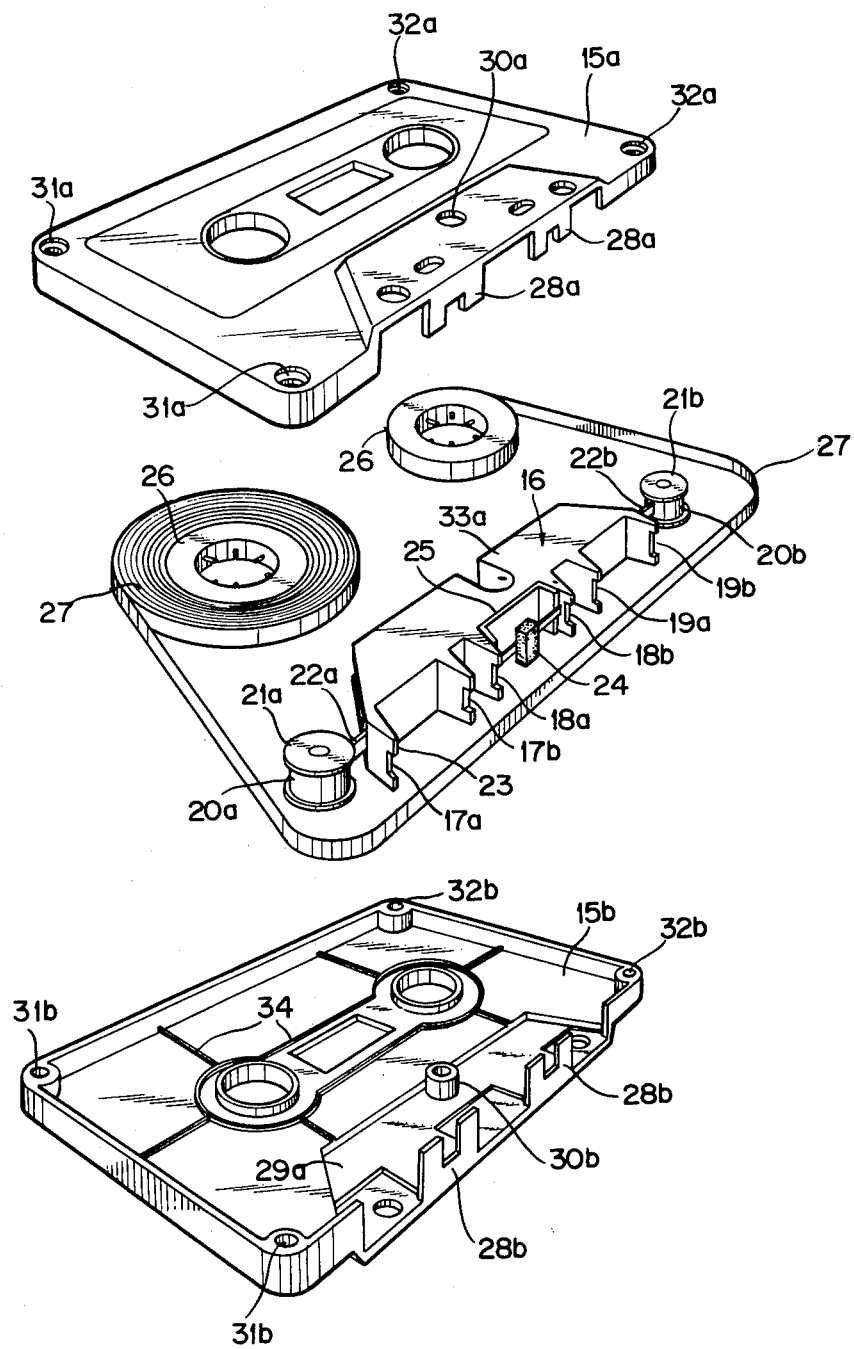

Referring now to FIGS. 3 to 9 showing an embodiment of the invention, a tape guide assembly 16 is so designed that when it is sandwiched between cassette halves 15a and 15b, inner surfaces 29a and 29b of the cassette halves 15a and 15b contact with the corresponding surfaces 33a and 33b of the tape guide assembly 16 thereby fixedly holding the assembly in place between the cassette halves. A magnetic tape 27, wound on a hub 26, is disposed so that the tape may be taken up on a hub 26b through a guide roller 20a of the tape guide assembly 16, through between tape guides 17a, 17b, 18a, 18b, 19a and 19b and the inner sides of window frames 28a and 28b of the cassette halves 15a and 15b and through another guide roller 20b, and the tape 27 is enclosed by the cassette halves 15a and 15b along with other component parts. With the internal component parts now contained within the cassette halves 15a and 15b, the cassette halves are fastened together by means of screws or the like through tapped holes 30a, 30b, 31a, 31b, 32a and 32b.

A pressure pad 24 and a shielding plate 25 are suitably fixedly held in place on the tape guide assembly 16, and guide rollers and other guide means are integrally formed through tension arms at the ends of the tape guide assembly 16 to extend therefrom. More specifically, the guide rollers 20a and 20b are respectively rotatably mounted on tape guide roller holders 21a and 21b, and the guide roller assembly is made integral with the tape guide assembly so that in accordance with the tape tension acting on the guide rollers, arms 22a and 22b adapted to serve as tension arms are respectively resiliently deflected suitably in the directions indicated by an arrow B thus causing the entire guide roller assembly to move suitably to the desired extent.

A plurality of guide projections 23 are integrally formed on each of the tape guides 17a, 17b, 18a, 18b, 19a and 19b of the tape guide assembly 16, and the forward end of each tape guide is formed with a vertical guide groove 35 of a width which is desirably and suitably greater than the magnetic tape width, whereby the magnetic tape is supported in the guide grooves 35 so as to be held and guided therethrough. The guide projections 23 are associated with the inner sides of the window frames 28a and 28b of the cassette halves 15a and 15b so as to serve the function of positioning and holding in place the entire tape guide assembly 16.

With the construction described above, the internal construction of the cassette halves 15a and 15b, particularly the construction of those portions associated with the tape guides is considerably simplified and flattened over that of the conventional cassettes as proved by the inner surfaces 29a and 29b, and thus this construction is advantageous in that no high degree of dimensional accuracy is required, the cassette halves involve no important working parts and can thus be considered as a mere case for holding the internal component parts, and the manufacture of molds is simplified and inexpensive, thus offering great advantages from the production and cost points of view. Further, while a high degree of dimensional accuracy is required for the tape guide assembly 16, the shape of the tape guide assembly 16 is such that it can be injection molded to the desired accuracy without any difficulty. The reason is that as will be seen from FIG. 8, the mold opening and releasing directions of the tape guide assembly 16 correspond to a direction in which the guide projections 23 extend and the opposite direction, namely, the directions indicated by an arrow C, so that there is no need to give any drafting taper to those portions including the tape guide faces 17a, 17b, 18a, 18b, 19a and 19b which serve the tape guiding function so as to ensure easy releasing of the molded products from the mold, and the shape of the tape guide assembly 16 permits the provision of the desired satisfactory drafting tapers in the other desired portions on the product releasing side. In addition, since the size of the tape guide assembly 16 is less than ¼ of the cassette halves 15a and 15b thus permitting the use of a multiple cavity mold, the tape guide assembly 16 is rational for injection molding purposes and convenient from the production and cost points of view. Further, since the cassette halves 15a and 15b are of the same shape and symmetrical and thus may consist of the identical parts, there is no need to distinguish one from the other, e.g., as a cassette body and a cover, namely, they can serve as a cassette body as well as a cover and only one kind of mold is needed, thus lending themselves to be extremely rational and advantageous from all the standpoints of production, handling, working and manufacturing cost. The tape guide assembly 16 also has the similar advantages, since it is also symmetrical and thus there is no need to make distinction between the upper and lower sides. Further, although the strains and distortions produced in the cassette halves 15a and 15b during the injection molding operation and having an effect on the azimuth characteristic of magnetic tape tend to cause them to warp in the directions indicated by an arrow D, by virtue of the fact that the cassette halves are identical in shape and symmetrical, their warpages are the same in nature and similar in degree and thus there is no possibility of variations in warpage. As a result, considering the cassette halves 15a and 15b alone, the cassette halves can be assembled in such a manner that their mating surfaces are brought into close contact with each other, with the result that the warpages and distortions equally compensate for one another and the contact surface forms a straight line, thus correcting the strains and distortions. Moreover, in the actual use there is no possibility of such distortions as indicated by the arrow D, since the cassette is assembled in such a manner that the tape guide assembly 16 is sandwiched and fixedly held in place between the cassette halves 15a and 15b, and since the tape guide assembly 16 is symmetrical and its mold opening and releasing directions during the injection molding operation are as shown by the arrow C so that when incorporated in the cassette these mold opening and releasing directions cross at right angles the corresponding directions of the cassette halves 15 and 15b, i.e., the outward and inward directions as shown by an arrow E. On the other hand, the cross-section of the tape guide assembly 16 is such that a U-shaped hollow portion 36 is defined between the surfaces 33a and 33b, and consequently if the portion including the guide projections 23 is looked at from the direction of the longitudinal section in FIG. 9, the upper half has a U-shaped cross-section and the entire unit has a substantially H-shaped cross-section. This means that the tape guide assembly 16 has a high degree of strength. This is also advantageous in that when the tape guide assembly 16 is sandwiched and fixedly held in place between a pair of cassette halves, the tape guide assembly 16 compensates for the strains and distortions produced in the cassette halves 15a and 15b as shown by the arrows D and in this way the entire cassette is reinforced. Further, as mentioned previously, there is no need to give any drafting taper to the portions of the tape guide assembly 16 which serve the tape guiding function, and generally the desired improvement of the azimuth characteristic of a magnetic tape for its sides A and B, the most important problem of cassettes, is accomplished thus greatly improving the mass productiveness, yield rate and working properties and thereby making it possible to provide cassettes which are inexpensive and high-performance. The tape mounting operation can also be performed very efficiently and advantageously, since it is only necessary to semi-permanently mount the tape guide assembly 16 on either the cassette half 15a or 15b and then place a magnetic tape in place. Where the magnetic tape 27 is a long tape so that it has an excessively large diameter when wound on the hubs 26a and 26b, the tape mounting operation can still be carried out advantageously and the space can also be saved, since the tape may be introduced into the hollow place 36 of the tape guide assembly 16. Still further, since the tape guide assembly 16 is a separate single-piece component, and since any material having excellent properties such as dimentional accuracy, temperature resistance, friction resistance, wear resistance, rigidity, elasticity and antistatic properties can be employed as desired in accordance with the requirements for injection molding tape guide assemblies, the tape guide assembly 16 is very rational and advantageous from the production, cost and performance points of view. The tape guide assembly 16 is also very advantageous from the performance point of view, since the guide roller assembly which also serves as tension arms is made integral with the tape guide assembly 16 so that the tension arms are suitably deflected resiliently in accordamce with the tension in the magnetic tape so as to absorb and control any irregular tape movement and fluctuations in the tape tension, thus stabilizing the tape movement and preventing the tape from being damaged during rapid fast forward and rewinding operations. While the guide rollers 20a and 20b may be rotatably mounted, the guide rollers may be integrally molded with the tension arms as stationary guides, and the selection may be made in consideration of cost requirement and other requisite conditions. Still further, a plurality of narrow ridges 34 are also molded on the inner surfaces of the cassette halves 15a and 15b so that the hubs 26a and 26b and the magnetic tape 27 wound on the former can be supported with the minimum contact area, thereby ensuring improved tape running and movement and a further reduction in the manufacturing cost.

What is claimed is:

1. A magnetic tape cassette, comprising in combination a molded upper cassette half, a molded lower cassette half, and a separately molded tape guide assembly sandwiched and fixedly held in place between said upper and lower cassette halves, said upper and lower cassette halves being identical in shape and structure, said cassette halves being symmetrically assembled to each other, said cassette halves and said tape guide assembly mutually compensating for strains and distortions produced therein during injection molding operation and reinforcing one another, to improve the running and azimuth characteristics of a magnetic tape in said cassette, said upper and lower cassette halves being a mere case for containing said separately molded tape guide assembly and a pair of hubs and a tape to be wound from hub to hub, said cassette halves having molded-in surface means for determining the proper positional relationship between cassette reference faces and openings in the outer surfaces of said cassette halves, on the one hand, and said separately molded tape guide assembly and hubs on the other hand, the path of tape movement between said hubs extending in a straight line from each hub to said separately molded tape guide assembly, said separately molded tape guide assembly having resilient tape engaging means.

2. A magnetic tape cassette, comprising in combination a molded upper cassette half, a molded lower cassette half, and a separately molded tape guide assembly sandwiched and fixedly held in place between said upper and lower cassette halves, said cassette halves and said tape guide assembly mutually compensating for strains and distortions produced therein during injection molding operations and reinforcing one another, to improve the running and azimuth characteristics of a magnetic tape in said cassette wherein said tape guide assembly includes at each end thereof guide means including a tension arm and a tape engageable means resiliently supported and integrally formed with said end through said tension arm extending therebetween, for absorbing and controlling fluctuations in the running speed, position and tension of said tape.

3. A magnetic tape cassette according to claim 2, in which each said tension arm is a resiliently deflectable leaf springlike member extending from the end of said separately molded tape guide assembly, said tape engageable means comprising upper and lower plates on the upper and lower edges of said leaf springlike member and a roller rotatably supported between said upper and lower plates, such that said roller is rotatably carried by said separately molded tape guide assembly but is resiliently deflectable with respect thereto by tape moving past said roller.

4. A magnetic tape cassette according to claim 2, wherein each of said cassette halves includes a plurality of narrow ridges formed on the inner surface thereof, whereby said magnetic tape is supported by said cassette halves with a minimum contact area therebetween.

5. A magnetic tape cassette according to claim 2, wherein said tape guide assembly includes a plurality of guide projections integrally formed therewith to control the running position of said tape, wherein each of said guide projections includes a guide groove vertically formed in the forward end thereof and having a width greater than the width of said tape to hold and guide the movement of said tape, and wherein the forward end portions of said guide projections flanking said guide grooves are in abutting relation with the inner sides of said cassette halves to position said tape guide assembly as a whole and fixedly block forward movement of said assembly relative to said cassette halves.

6. A magnetic tape cassette assembly according to claim 5, in which said cassette halves comprise a substantially flat base bounded by a relatively short upstanding peripheral wall having front and rear and side portions, the front portion of said wall being segmented along its length by a plurality of windows, the tops of the upstanding front wall segments being coplanar with the top of the remaining portions of said peripheral wall and laterally opposing the middle of each said guide grooves of said tape guide assembly, such that said forward end portions of said guide projections oppose said window separated segments of said upper and lower cassette halves at the same distance from the tops of such segments.

7. A magnetic tape cassette, comprising in combination a molded upper cassette half, a molded lower cassette half, and a separately molded tape guide assembly sandwiched and fixedly held in place between said upper and lower cassette halves, said upper and lower cassette halves being identical in shape and structure, said upper and lower cassette halves also being mirror images of each other such that each surface feature of one said half directly opposes an identical surface feature of the other half, said cassette halves forming a hollow cassette body which is symmetrical about two mutually perpendicular central planes, one said plane being the plane of separation between said cassette halves and the other said plane bisecting both said body and said tape guide assembly, said cassette halves and said tape guide assembly mutually compensating for strains and distortions produced therein during injection molding operation and reinforcing one another.

* * * * *